United States Patent
Bayer et al.

(10) Patent No.: US 9,758,643 B2
(45) Date of Patent: Sep. 12, 2017

(54) METHODS FOR THE PRODUCTION OF BIODEGRADABLE PLASTICS MATERIAL FROM CELLULOSE PLANT WASTES

(71) Applicant: FONDAZIONE INSTITUTO ITALIANO DI TECHNOLOGIA, Genoa (IT)

(72) Inventors: Ilker S. Bayer, Genoa (IT); Elisa Mele, Castrignano Dei Greci (IT); Despina Fragouli, Genoa (IT); Roberto Cingolani, Ceranesi (IT); Athanasia Athanasiou, Ceranesi (IT)

(73) Assignee: FONDAZIONE ISTITUTO ITALIANO DI TENOLOGIA, Genova (IT)

( * ) Notice: Subject to any disclaimer, the term of this patent is extended or adjusted under 35 U.S.C. 154(b) by 0 days.

(21) Appl. No.: 15/030,890

(22) PCT Filed: Oct. 29, 2014

(86) PCT No.: PCT/IB2014/065688
§ 371 (c)(1),
(2) Date: Apr. 21, 2016

(87) PCT Pub. No.: WO2015/063700
PCT Pub. Date: May 7, 2015

(65) Prior Publication Data
US 2016/0251501 A1    Sep. 1, 2016

(30) Foreign Application Priority Data
Oct. 29, 2013 (IT) .............................. TO2013A0874

(51) Int. Cl.
C08L 1/02      (2006.01)
C08B 16/00     (2006.01)
C08L 99/00     (2006.01)

(52) U.S. Cl.
CPC ............... *C08L 1/02* (2013.01); *C08B 16/00* (2013.01); *C08L 99/00* (2013.01)

(58) Field of Classification Search
CPC ......................................................... C08L 1/02
See application file for complete search history.

(56) References Cited

U.S. PATENT DOCUMENTS

2010/0297704 A1*  11/2010  Li ........................... C12P 19/14
                                                                    435/72
2013/0274455 A1    10/2013  Parekh et al.

FOREIGN PATENT DOCUMENTS

DE    19755352 C1     6/1999
WO    2010094240 A1   8/2010

OTHER PUBLICATIONS

Garner et al, inorganic compounds containing the trifluoroacetate group, 1975, advances in inorganic chemistry and radiochemistry, p. 4.*

(Continued)

*Primary Examiner* — Melvin C Mayes
*Assistant Examiner* — Stefanie Cohen
(74) *Attorney, Agent, or Firm* — Robert E. Alderson, Jr.

(57) ABSTRACT

Methods for the production of a biodegradable plastics material obtained from plant waste materials are provided which include the steps of dissolving plant waste material in an anhydrous solvent which includes anhydrous trifluoroacetic acid in order to dissolve a cellulose fraction of the material, the waste material being at least partly dehydrated in such a way that its water content is not likely to cause hydrolysis of the cellulose fraction, and removing the solvent from the solution containing the non-hydrolyzed cellulose fraction.

16 Claims, 3 Drawing Sheets

(56) References Cited

OTHER PUBLICATIONS

Dong et al, Using trifluoroacetic acid to pretreat lignocellulosic biomass, 2009, biomass and bioenergy, 33, pp. 1719-1733.*

Makoto Hasegawa, Akira Isogai, Fumihiko Onabe, Makoto Usuda, Dissolving States of Cellulose and Chitosan in Trifluoroacetic Acid, 2296 Journal of Applied Polymer Science, Aug. 5, 1992, pp. 1857-1863, vol. 45, No. 10, XP000281213, John Wiley & Sons, Inc., New York, USA.

Paola Di Donato, Gabriella Fiorentino, Gianluca Anzelmo, Giuseppina Tommonaro, Barbara Nicolaus, Annarita Poli, Re-Use of Vegetable Wastes as Cheap Substrates for Extremophile Biomass Production, Waste Biomass Valor, Jan. 28, 2011, pp. 103-111, Springer Science+Business Media B.V., DOI 10.1007/s12649-011-9062-x.

Federico Federici, Fabio Fava, Nicolas Kalogerakis, Dionissios Mantzavinos, Valorisation of agro-industrial by-products, effluents and waste: concept, opportunities and the case of olive mill wastewaters, Journal of Chemical Technology and Biotechnology, Jun. 2009, (published online in Wiley Interscience Apr. 6, 2009), pp. 895-900, vol. 84, DOI 10.1002/jctb.2165, Society of Chemical Industry.

* cited by examiner

METHODS FOR THE PRODUCTION OF BIODEGRADABLE PLASTICS MATERIAL FROM CELLULOSE PLANT WASTES

CROSS-REFERENCE TO RELATED APPLICATIONS

This application is a National Phase Application of PCT International Application No. PCT/IB2014/065688, International Filing Date, Oct. 29, 2014, claiming priority to Italian Patent Application No. TO2013A000874 (102013902203288), filed Oct. 29, 2013, each of which is hereby incorporated by reference in its entirety.

FIELD OF THE INVENTION

This invention relates to a process for the production of biodegradable plastics materials and biodegradable composite plastics materials using cellulose plant wastes, particularly those deriving from edible herbs, greens and cereals.

The object of the invention is to reutilise plant wastes of the abovementioned type through an economical and ecological technology which converts them into bioplastics.

BACKGROUND OF THE INVENTION

In fact the reutilisation of biological wastes or low value secondary products deriving from plant materials which have undergone processing has hitherto received little consideration. Most plant wastes are in fact burnt or used as natural compost or as animal feed.

The reutilisation of plant wastes from industrial processes is therefore a relatively recent concept, intended to promote sustainable development. The publication in the Journal of Chemical Technology and Biotechnology, vol. 84, ed. 6, pages 895-900, June 2009 is a review which identifies and discusses sustainable ways of promoting reuse, describing in particular the example of the reutilisation of waste waters from the production of olive oil. In addition to this, recent works have dealt with the use of plant wastes as a growth medium for the fermentation of extremophile biomass (see for example: Waste and Biomass Valorization, May 2011, vol. 2, ed. 2, pages 103-111).

However the treatment of process plant wastes, such as for example inedible stalks, or damaged leaves or surpluses originating from edible plants and greens (such as parsley, spinach, basil, etc.) or residues deriving from the harvesting of cereals using solutions which minimise the release of carbon dioxide has hitherto received little attention.

SUMMARY OF THE INVENTION

This invention therefore provides methods for the conversion of (generally inedible) plant wastes into biopolymers as described and claimed herein.

DETAILED DESCRIPTION

In its embodiments the invention makes it possible to prepare bioplastics having a wide range of physical characteristics and mechanical properties such as elasticity, rigidity, transparency, solubility and environmental stability.

One embodiment of the process relates to the preparation of substantially or predominantly amorphous cellulose films or sheets through the dispersion of at least partly dehydrated plant wastes in anhydrous trifluoroacetic acid (TFA). In this embodiment the crystalline cellulose component of the dried or at least partly dehydrated plant residues is converted into the amorphous state by dissolution in an anhydrous solvent mixture comprising anhydrous trifluoroacetic acid (whose cellulose decrystallisation properties are known (see Journal of Applied Polymer Science 45(10), 1857-1863, 1992)).

As an alternative, the anhydrous solvent mixture may comprise anhydrous trifluoroacetic acid and trifluoroacetic anhydride (TFAn), the quantity of trifluoroacetic anhydride being preferably from 10 to 50% by volume with reference to the volume of acid.

Use of a solvent mixture of TFA and TFAn offers the advantage of very much faster dissolution in comparison with the use of anhydrous TFA alone; dissolution may therefore take place within the space of a few hours, and furthermore there is no need to filter out undissolved components. Dissolution may also be accelerated to less than one hour if the TFA-TFAn mixture is heated to temperatures up to approximately 50° C., for example 45° C.

It has also been found that use of TFA-TFAn mixture makes it possible to obtain bioplastics having greater elasticity properties, with a substantially reduced Young's modulus, under the same conditions.

The plant wastes used as a starting material preferably comprise wastes or surpluses of edible plants belonging to the classes of the Apiaceae and Amaranthaceae, such as for example basil, parsley and spinach, but may also include other cereal residues, cocoa or nut husks, or other greens.

The term "dehydrated" is not intended to indicate the need for total dehydration, but is merely indicative of an initial drying treatment which may be carried out simply by exposure to environmental conditions, without the need to eliminate the water content of the wastes undergoing processing. The free or bound water content of the plant wastes must however be low and such as not to cause hydrolysis of the cellulose fraction during treatment with the abovementioned anhydrous solvent.

The process according to the invention is compatible with the presence of a relatively small quantity of water, for example less than 10% or better 5% by weight of starting material; use of a wholly anhydrous material is however preferred.

The at least partly dehydrated or dried waste material is preferably used in the form of a powder, for example having particle dimensions from 10 μm to 200 μm, although particles of sizes smaller or larger than those indicated by way of example may be used.

Typically the process uses a concentration of plant wastes in anhydrous solvent of the order of 0.5% to 5% by weight, more preferably from 1% to 2% by weight. This percentage depends on the cellulose content of the starting plant material and may require optimisation which can easily be achieved through observation and determination of the rate at which the waste material used dissolves in TFA and from the consistency and viscosity of the final solution obtained at specific times during treatment with TFA.

By way of indication, from a 3% by weight concentration of dehydrated parsley wastes in TFA it is possible to obtain solutions having a viscosity suitable for the subsequent casting process after a few days of treatment in solvent. Dissolution of the waste material may be accelerated by ultrasound treatment, for example with times of 10 minutes to 40 minutes using moderate energy at ambient temperature, when desired.

Generally dissolution is performed in a closed container under ambient temperature conditions, in times of preferably more than 3 days, depending upon the source of the waste plant material used, so as to allow slow dissolution and decrystallisation of the cellulose.

The solution obtained may however be stored and kept for longer periods, for example up to 15 days to ensure that all the cellulose is separated from the lignin part and is effectively dissolved. During treatment with the anhydrous solvent extracts, colouring agents and essential oils in the plant material used are infused in solution and can in any event be kept in the solution which is intended to undergo casting.

After prolonged storage the solutions become coloured because of the extraction of plant colouring agents, tannins, flavonoids, carotinoids, anthracenes, betaine, etc.

Alternatively undesired impurities or compounds, or the insoluble fraction, may be removed by filtration or centrifuging.

By direct casting of the solution so obtained, performed in moulds of non-adhesive plastics material, or moulds of glass or ceramic materials not attacked by TFA, films and sheets of self-supporting plastics material are obtained after the solvent has been evaporated off.

The solvent may be evaporated off under ambient conditions. TFA is a biodegradable acid which can be degraded by bacteria, so its disposal does not give rise to any environmental problems; however, the TFA may also be recovered during evaporation and may be recycled to the process according to the invention in order to minimise costs.

Films, sheets or shaped products obtained by direct casting of plant waste solutions in TFA generally contain undissolved plant materials such as lignins, lipids or waxes. Removal of such compounds after the stage of dissolution in solvent, through centrifuging or filtration (for example with a filter having 0.2 µm pores), may be desirable in order to obtain products having improved and uniform structural and optical characteristics.

In another embodiment, the solution obtained (that is with or without the removal of undissolved components) may be mixed in any desired proportions with optically clear solutions of pure cellulose (microcrystalline cellulose) in anhydrous TFA, for example using 1% to 4% by weight solutions of cellulose in TFA.

In another embodiment, the solutions or suspensions (with or without the filtration of undissolved components) can be mixed with other biocompatible or biodegradable polymers which can dissolve in TFA. In this context the preferred polymers comprise polyamides, polycaprolactones, polyvinyl acetates or polyvinyl acetate emulsions, polyesters, preferably PET polyesters obtained from recycling and polyvinylformyl resins. Solutions of these polymers in TFA may have concentrations from 1% to 5% by weight of polymer in TFA.

Any ratio by weight between these polymers and the plant wastes used as starting material may be used. Even in this case the solutions so obtained may undergo casting for the production of composite plastics materials.

In another embodiment, the solutions or suspensions of plant wastes described above can be combined with solutions in TFA obtained from packaging materials wastes, such as for example sacks or bags for coffee made of hemp fibre. These fibres, which are known to be used as fibres for sacks for coffee beans, are commercially available (see for example: http://johnsonpaper.com/kona/).

Such waste materials may be recycled by preparing solutions in TFA as described above.

Solutions in TFA or in mixtures of TFA and trifluoroacetic anhydride obtained from plant waste materials in combination with the polymers mentioned above may in another embodiment undergo spinning to obtain products having a cross-linked fibrous structure using the conventional technique of electrospinning, which comprises the manufacture of fibres having a diameter of less than a few µm by applying high voltages to a polymer solution; this technique makes it possible to obtain mats of composite fibres which incorporate useful constituents of the plants such as antioxidants, essential oils, antimicrobial agents and/or pleasant aromas. The abovementioned polymer mixtures may also be processed by extrusion using standard extrusion techniques to form composite bioplastics structures.

In another embodiment, solutions of plant wastes in TFA or mixtures of TFA and trifluoroacetic anhydride may be further diluted with acetone, preferably after filtration and preferably after a period of 5 to 15 days from the start of dissolution. The quantities of acetone which may be added for dilution will depend on the ageing time of the solution in solvent and may vary from 25% for short ageing times (for example 5 days) to 90% for long ageing times (for example 29 days), the quantities mentioned referring to the quantity of acetone added with reference to the weight of starting solution or suspension.

In this embodiment the concentration of plant wastes in the TFA solution or mixtures of TFA and trifluoroacetic anhydride is preferably between 1% and 3% by weight. Following the addition of acetone and mechanical mixing (for example for a few minutes) the solutions may undergo casting as described previously. The use of acetone, which is not a solvent, exercises an important function, in that in forming an azeotrope with TFA it makes it possible for the TFA to evaporate with acetone under ambient conditions, largely preventing partial acylation of the cellulose portion in the plant wastes.

In yet another embodiment, the process according to the invention may be applied to plant wastes which have previously been treated following the extraction of essential oils and/or antioxidants using standard solvent extraction or distillation techniques. The plastics materials so obtained do not have antimicrobial and antioxidant properties because of the significant initial reduction in such compounds.

Example 1

Figure 1:
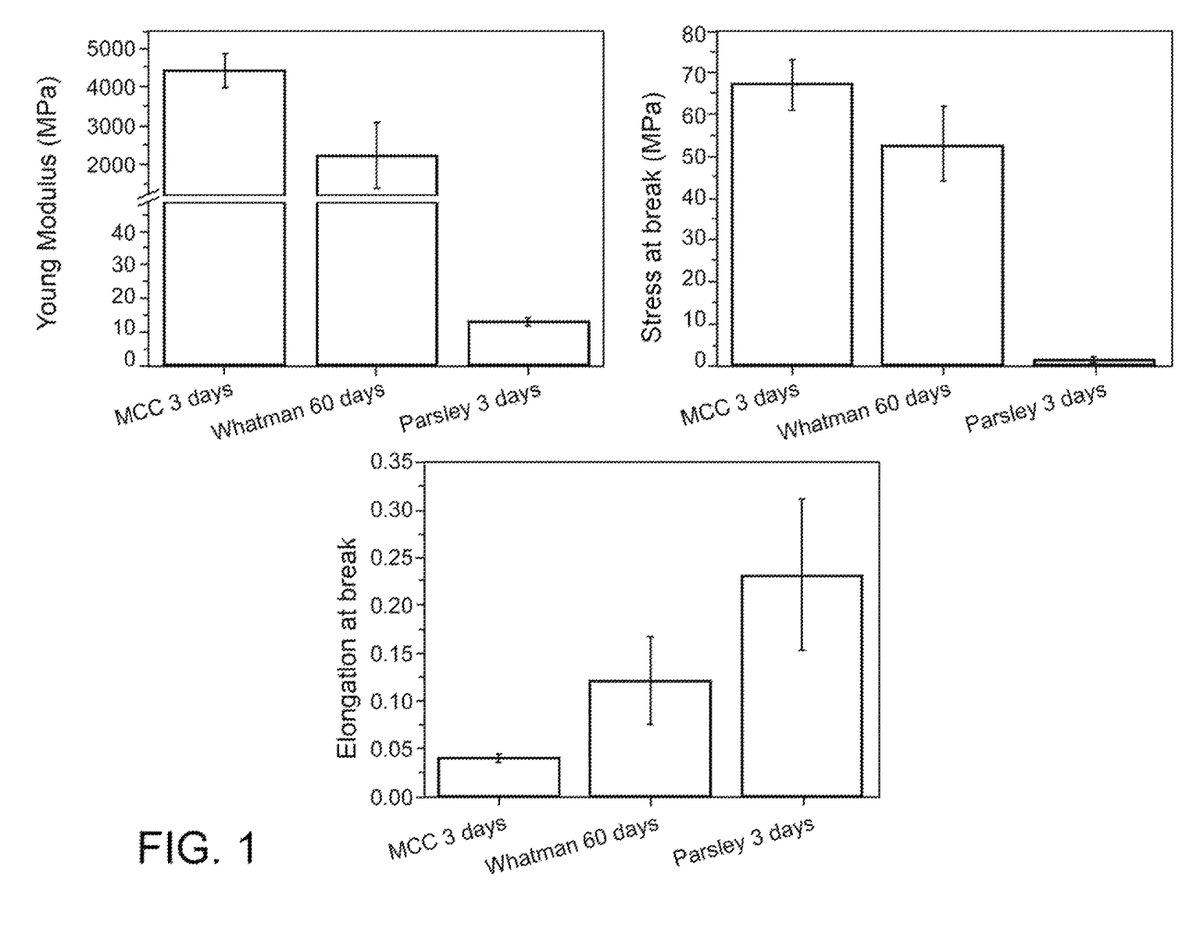
FIG. 1 shows a histogram of the mechanical properties (Young's modulus, tensile stress and tensile strain) of cellulose films according to Example 1 and films obtained from parsley, as a function of treatment time in trifluoroacetic acid.

A solution of microcrystalline cellulose (MCC) or pure cellulose fibres from the Whatman paper was prepared dissolving 1% to 3% of MCC or paper in anhydrous trifluoroacetic acid. The solution generally became clear after 3 days. Films can be obtained by casting from this solution after 3 days, 7 days, 10 days and 14 days; the mechanical properties of these films are shown in FIG. 1 in comparison with the mechanical properties obtained for the films in Example 2 below.

Example 2

Flakes of dried parsley stalks, as received from parsley processing plants, can be dissolved in a similar way to that illustrated in Example 1 and films can be prepared during the same periods of time, for example 3 days, 7 days, 10 days and 14 days, up to 60 days. FIG. 1 compares the mechanical properties of these films with the mechanical properties of the films in Example 1.

Example 3

Cocoa waste (husks) obtained from the chocolate industry may be dissolved in anhydrous trifluoroacetic acid as described in Example 1. Longer treatment times are required in order to obtain films of plastics material from cocoa wastes. Ideally 25 to 30 days are required for dissolution in trifluoroacetic acid in order to achieve the film-producing state.

Example 4

In a similar way, dehydrated spinach waste can be dissolved in trifluoroacetic acid as described in Example 1. However the best solutions for producing films are obtained if the spinach waste is held in solution for times longer than 25 days, as in the case of the cocoa wastes described in Example 3. The films obtained from spinach waste after 29 days are soft and elastic in comparison with the films obtained from the other examples described above; see in this respect the mechanical properties in FIG. 2.

Example 5

Dehydrated rice husk waste can be processed to produce films as described in the preceding examples. However, as in Examples 3 and 4, rice husks require longer dissolution times in trifluoroacetic acid; the time is preferably between 25 and 30 days. Thin uniform films having a good structure can be obtained by casting from rice solution after 29 days of immersion in acid (see FIG. 2).

Example 6

It is also possible to obtain biofilms from mixtures of the abovementioned plant wastes. For example the cellulose solution obtained in Example 1 (preferably after 3 or 7 days) can be mixed with a solution obtained from the parsley in Example 2 (preferably after 29 days or more) in any proportions to form films comprising mixtures of cellulose and parsley.

Example 7

Similarly, the cellulose solution from Example 1 may be mixed in any ratio with the solution obtained from cocoa waste in Example 3, or the solution obtained from spinach in Example 4, or again the solution from rice husks in Example 5, ensuring that all these plant waste solutions have been aged for more than 25 days.

Example 8

It is also possible to obtain biofilms formed from mixtures obtained from any of the solutions in Examples 2, 3, 4 or 5 in any ratio or any combination provided that the solutions have been obtained by treatment for at least 29 days.

Figure 2:
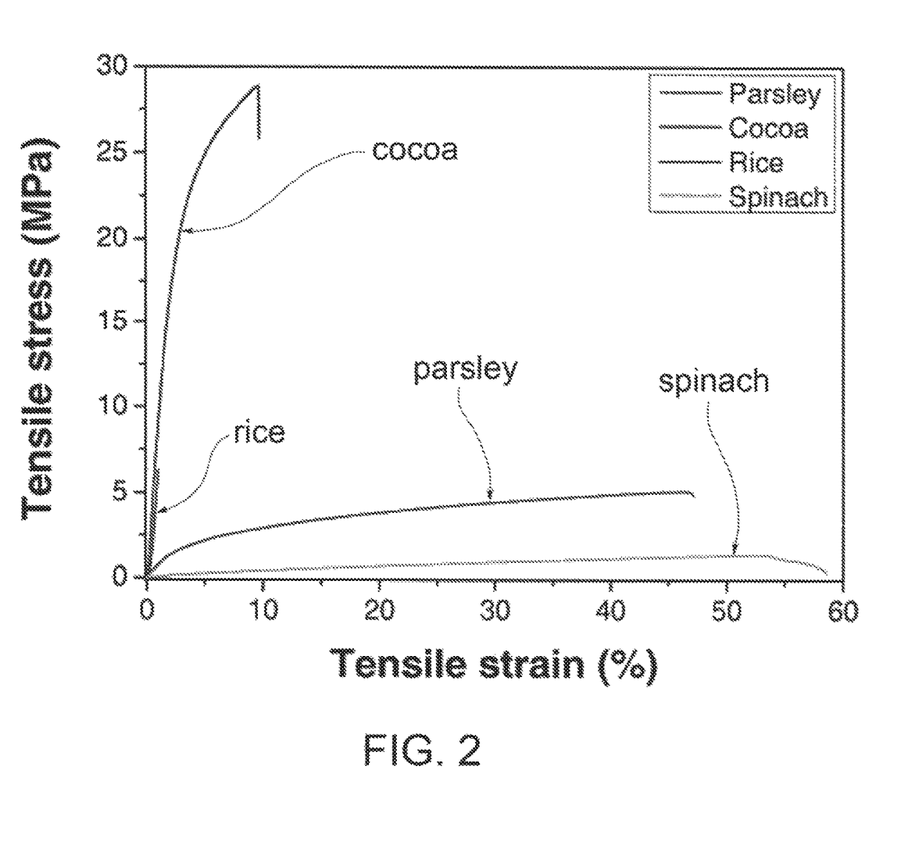
FIG. 2 is a force/deformation diagram for biodegradable films obtained from various plant sources: parsley, cocoa, rice and spinach.

Table 1 shows values for Young's modulus, tensile stress and tensile strain for films obtained from the plant sources in FIG. 2.

TABLE 1

| Plant material | E (MPa) | Tensile stress (MPa) | Elongation (%) |
| --- | --- | --- | --- |
| Cocoa | 1128 ± 132 | 27 ± 4 | 9 ± 3 |
| Rice | 886 ± 156 | 6.4 | 1 |
| Parsley | 75 ± 17 | 5.2 ± 0.5 | 51 ± 6 |
| Spinach | 5 ± 0.6 | 1.4 ± 0.4 | 60 ± 1 |

Example 9

A mixture of TFA and TFAn having a TFAn to TFA ratio of 0.5:1 by volume was prepared. The solution was stirred for approximately 10 minutes in an airtight container.

Figure 3:
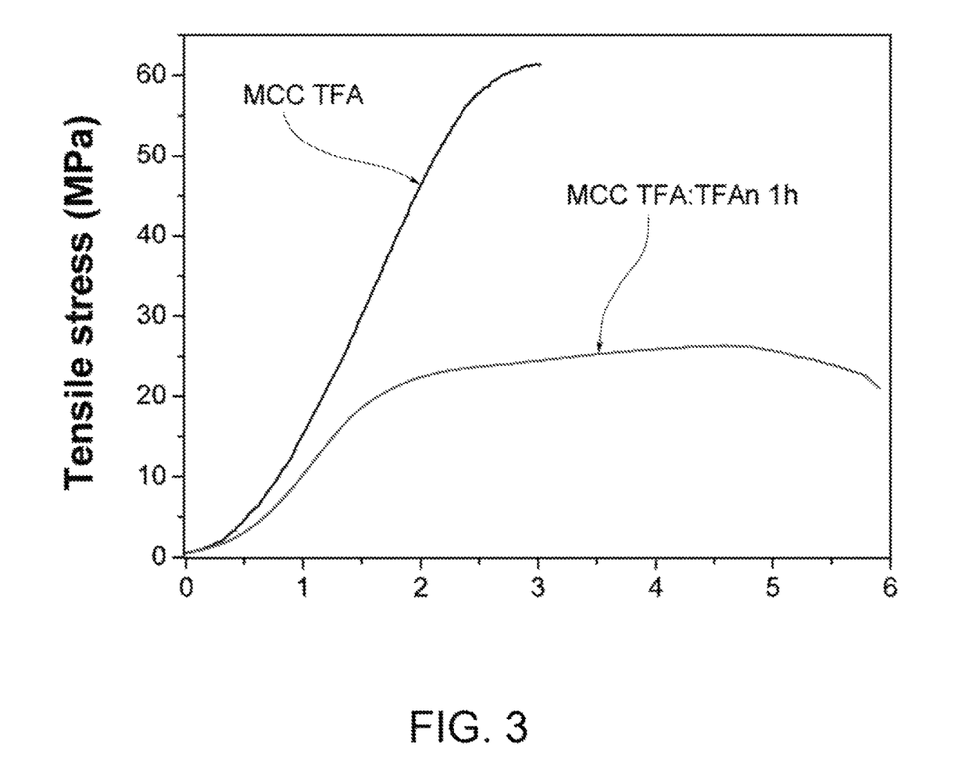
FIG. 3 is a force/deformation diagram relating to biodegradable films obtained in accordance with Example 9 using TFA in comparison with TFA:TFAn.

Particles of microcrystalline cellulose having a solids concentration of 3% by weight in the solvent mixture were added to this solution; the mixture so obtained was then kept stirring for several hours until dissolution was complete; dissolution can be accelerated to less than one hour by heating to a temperature of 45 to 50° C. Plastics materials in film form obtained after casting show higher tensile strain values and smaller Young's moduli in comparison with films obtained using anhydrous TFA alone under the same conditions. The corresponding mechanical properties are illustrated in FIG. 3 and Table 2 below.

TABLE 2

| Sample | Young's modulus (MPa) | Tensile stress (MPa) | Tensile strain (%) |
| --- | --- | --- | --- |
| MCC TFA | 3127 | 61 | 3 |
| MCC TFA:TFAn | 1518 | 26 | 5.9 |

Example 10

The process according to Example 9 was repeated using dehydrated plant wastes such as parsley, spinach, cocoa, rice husks, again in this case using an anhydrous solvent of TFAn:TFA in a ratio of 1:2 by volume, with the concentration of waste from 1 to 3% by weight with reference to the solvent mixture. Again in this case use of the solvent mixture brings about substantial acceleration of the dehydrated plant wastes' dissolution rate.

The mechanical properties of the films obtained by casting with a treated materials concentration of 3% by weight in the solvent mixtures are shown in Table 3.

TABLE 3

| Samples | In TFA | | | In TFA:TFAn (1:0.5) | | |
|---|---|---|---|---|---|---|
| | Young's modulus (MPa) | Tensile stress (Mpa) | Tensile strain (%) | Young's modulus (MPa) | Tensile stress (Mpa) | Tensile strain (%) |
| Cocoa 3% w/w | 1000 | 30 | 10 | 850 | 20 | 28 |
| Parsley 3% w/w | 70 | 4.5 | 48 | 59 | 3.0 | 68 |
| Spinach 3% w/w | 4 | 2.0 | 58 | 2 | 1.5 | 70 |
| Rice 3% w/w | 1000 | 7.5 | 3.0 | 880 | 5.5 | 8.5 |

Example 11

The procedure was as in Example 2 using different mixtures of cellulose and dehydrated plant wastes in ratios from 0.1 to 1 by weight using a solvent mixture containing TFAn:TFA in a ratio of 1:2 by volume and a concentration in solvent of 1 to 3% by weight; the mixture was stirred until the solids were dissolved over the course of a number of hours; the solvent drastically accelerates the dissolution rate from several days to several hours.

The mechanical properties of the films obtained by casting with a treated materials concentration of 3% by weight in the solvent mixtures are shown in Table 4.

TABLE 4

| Samples | In TFA | | | In TFA:TFAn (1:0.5) | | |
|---|---|---|---|---|---|---|
| | Young's modulus (MPa) | Tensile stress (Mpa) | Tensile strain (%) | Young's modulus (MPa) | Tensile stress (Mpa) | Tensile strain (%) |
| Spinach:MCC 7:3 3% w/w | 955 | 17 | 10 | 845 | 12 | 26 |
| Spinach:MCC 1:9 3% w/w | 2240 | 45 | 4 | 2016 | 33 | 12 |

Example 12

The procedure was as in Example 11 using various cellulose mixtures with other biodegradable polymers such as polycaprolactones, polyvinyl alcohol, polyvinyl acetate and their copolymers, polylactic acid and polylactic acid copolymers (cellulose:polymer ratio by weight from 0:1 to 1:0) added to the solvent mixture containing TFAa:TFA in a ratio of 1:2 by volume in quantities from 1 to 3% by weight instead of the mixture of cellulose and dehydrated plant wastes (parsley, spinach, cocoa and rice husks); the mixture was stirred until complete dissolution occurred within a few hours. The solvent drastically accelerates the dissolution rate from several days to several hours.

The mechanical properties of the films obtained by casting using a treated materials concentration of 3% by weight in the solvent mixtures are shown in Table 5.

TABLE 5

| Samples | In TFA | | | In TFA:TFAn (1:0.5) | | |
|---|---|---|---|---|---|---|
| | Young's modulus (MPa) | Tensile stress (Mpa) | Tensile strain (%) | Young's modulus (MPa) | Tensile stress (Mpa) | Tensile strain (%) |
| Polyvinyl alcohol 3% w/w | 150 | 15 | 693 | 175 | 16 | 650 |
| Polyvinyl alcohol:MMC 1:1 3% w/w | 260 | 12 | 100 | 350 | 13 | 102 |

Example 13

The procedure was as for Example 12 using cellulose in combination with non-biodegradable polymers (soluble in the same solvent) such as polyacrylate resins and polyamides, such as PMMA and nylon (cellulose:polymer ratio by weight from 0:1 to 1:0) added to the solvent mixture containing TFAn:TFA 1:2 by volume in quantities of 1 to 3% by weight instead of cellulose or the mixtures of cellulose with biodegradable polymers; the mixture was dissolved until the solids dissolved within the scope of a few hours. The solvent drastically accelerates the dissolution rate from several days to several hours.

The mechanical properties of the films obtained by casting using a treated materials concentration of 3% by weight in the solvent mixtures are shown in Table 5.

TABLE 6

| Samples | In TFA | | | In TFA:TFAn (1:0.5) | | |
|---|---|---|---|---|---|---|
| | Young's modulus (MPa) | Tensile stress (Mpa) | Tensile strain (%) | Young's modulus (MPa) | Tensile stress (Mpa) | Tensile strain (%) |
| PMMA 3% w/w | 2000 | 20 | 1.8 | 2100 | 23 | 2.5 |
| PMMA:MMC 7:3 3% w/w | 2300 | 65 | 5 | 2400 | 73 | 6.5 |

Example 14

Polymer mixtures obtained from Examples 12 and 13, preferably containing less than 50% by weight of cellulose or plant wastes with respect to the polymer, can be extruded in various shapes and moulded inasmuch as the non-cellulose components of the mixture are thermoformable polymers such as biologically based polyesters, polyacrylates and polyamide resins. In this way the cellulose can be naturally maintained and preserved in the extruded final product as a reinforcing agent without it having to be synthesised or added separately during extrusion in the form of nanopowders or nanowhiskers, which are more complex and costly to synthesise separately.

The invention thus provides a process through which plant wastes which are normally intended to be burnt can be reutilised, making it possible to obtain biodegradable plastics materials having a wide range of properties, including those having inherent antioxidant and antibacterial properties, natural colouring agents and aromas, and antimicrobial and antifungal effects in particular.

Manufacture does not require high energy consumption; the plastics materials may be converted into finished products using conventional moulding and extrusion techniques.

In addition to this the plastics materials obtained are impermeable to water and may be painted using conventional water- or organic-solvent-based paints.

The invention claimed is:

1. Process for the production of a biodegradable plastics material obtained from plant waste materials, characterised in that it comprises the operations of:
   a) dissolving the said plant waste material in an anhydrous solvent comprising anhydrous trifluoroacetic acid in order that a cellulose fraction of that material may be dissolved, the said waste material being at least partly dehydrated to the extent that its water content is not suitable to cause hydrolysis of the said cellulose fraction, and
   b) removing the solvent from the solution containing the non-hydrolysed cellulose fraction.

2. The method of claim 1, wherein the solvent mixture comprises trifluoroacetic anhydride in a quantity from 10 to 50% by volume with reference to the volume of trifluoroacetic acid.

3. The method of claim 1, wherein the product resulting from the dissolving in step a) undergoes
   d) filtration or centrifuging to remove non-soluble components from the solvent mixture prior to removal of said solvent mixture.

4. The method of claim 1, wherein the product obtained in step a) is mixed with a solution of microcrystalline cellulose in trifluoroacetic acid.

5. The method of claim 4, wherein said microcrystalline cellulose solution has a microcrystalline cellulose content from 1% to 4% by weight in trifluoroacetic acid.

6. The method of claim 1, wherein the dissolution product obtained in step a) is combined with one or more solutions of biodegradable or biocompatible polymer in trifluoroacetic acid.

7. The method of claim 3, wherein the dissolution product obtained in step d) is combined with one or more solutions of biodegradable or biocompatible polymer in trifluoroacetic acid.

8. The method of claim 6, wherein said biodegradable or biocompatible polymer is selected from the group consisting of: polyamides, polycaprolactones, polyvinyl acetate, polyvinyl acetate emulsion, polyvinylformyl resins and their mixtures.

9. The method of claim 8, wherein the solution of polymer in trifluoroacetic acid has a polymer concentration from 1% to 5% by weight.

10. The method of claim 7, wherein the solution obtained in step d), to which the solution of biodegradable or biocompatible polymer has been added, undergoes electrospinning for the production of fibers.

11. The method of claim 1, wherein said solution obtained in step a) is combined with a solution of waste or recycled plant fibers, obtained from hemp fiber packaging materials, in trifluoroacetic acid.

12. The method of claim 3, wherein the solution obtained in step d), to which a solution of crystalline microcellulose in trifluoroacetic acid or a solution of biodegradable or biocompatible polymer in trifluoroacetic acid solution has been added, undergoes casting in a mould and the solvent is removed by evaporation of the solvent in the casting mould.

13. The method of claim 12, wherein said solution in trifluoroacetic acid solution is diluted with acetone before evaporation of the solvent.

14. The method of claim 1, wherein said plant waste material comprises plant waste powder and is added to the said anhydrous solvent in a concentration from 0.5% to 5% by weight.

15. The method of claim 14, wherein said powder has dimensions of between 10 μm and 200 μm.

16. The method of claim 1, wherein the plant wastes comprise edible plants belonging to the class of the Apiaceae or Amaranthaceae and is wholly dehydrated.

* * * * *

UNITED STATES PATENT AND TRADEMARK OFFICE
CERTIFICATE OF CORRECTION

PATENT NO. : 9,758,643 B2
APPLICATION NO. : 15/030890
DATED : September 12, 2017
INVENTOR(S) : Ilker S. Bayer et al.

It is certified that error appears in the above-identified patent and that said Letters Patent is hereby corrected as shown below:

On the Title Page

Item (71)
Applicant now reads: FONDAZIONE INSTITUTO ITALIANO DI TECHNOLOGIA, Genoa (IT)
Applicant should read: FONDAZIONE ISTITUTO ITALIANO DI TECNOLOGIA, Genova (IT)

Item (72)
Inventors now read: Ilker S. Bayer, Genoa (IT), Elisa Mele, Castrignano dei Greci (IT), Despina Fragouli, Genoa (IT), Roberto Cingolani, Ceranesi (IT), Athanasia Athanasiou, Ceranesi (IT)
Inventors should read: Ilker S. Bayer, Genova (IT), Elisa Mele, Castrignano dei Greci (Lecce) (IT), Despina Fragouli, Genova (IT), Roberto Cingolani, Ceranesi (Genova) (IT), Athanasia Athanasiou, Ceranesi (Genova) (IT)

Item (73)
Assignee now reads: FONDAZIONE ISTITUTO ITALIANO DI TENOLOGIA, Genova (IT)
Assignee should read: FONDAZIONE ISTITUTO ITALIANO DI TECNOLOGIA, Genova (IT)

Signed and Sealed this
Fourteenth Day of November, 2017

Joseph Matal
*Performing the Functions and Duties of the
Under Secretary of Commerce for Intellectual Property and
Director of the United States Patent and Trademark Office*